(12) United States Patent
Christian (10) Patent No.: US 11,269,060 B1
(45) Date of Patent: Mar. 8, 2022

(54) DETERMINATION OF WHETHER A BOUNDARY INCLUDES AN INTERRUPTION

(71) Applicant: Locometric Limited, Stockport (GB)

(72) Inventor: Max Christian, Stockport (GB)

(73) Assignee: Locometric Limited, Stockport (GB)

( * ) Notice: Subject to any disclaimer, the term of this patent is extended or adjusted under 35 U.S.C. 154(b) by 0 days.

(21) Appl. No.: 17/371,324

(22) Filed: Jul. 9, 2021

(51) Int. Cl.
*G01S 7/48* (2006.01)
*G01S 17/89* (2020.01)

(52) U.S. Cl.
CPC ............ *G01S 7/4802* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 8,868,375 B1 | 10/2014 | Christian | |
| 10,627,512 B1* | 4/2020 | Hicks | G06T 5/50 |
| 10,671,068 B1* | 6/2020 | Xu | G06N 5/04 |
| 2019/0035100 A1* | 1/2019 | Ebrahimi Afrouzi | G06K 9/00201 |
| 2019/0072648 A1* | 3/2019 | Iwai | G01S 7/4808 |
| 2019/0114798 A1* | 4/2019 | Afrouzi | G01C 21/30 |
| 2020/0019169 A1* | 1/2020 | Suvarna | A47L 9/2894 |
| 2020/0301439 A1* | 9/2020 | Saito | G01S 17/89 |
| 2020/0379115 A1* | 12/2020 | Yang | G01S 7/4808 |

FOREIGN PATENT DOCUMENTS

GB 2498177 A 10/2013

OTHER PUBLICATIONS

MagicPlan, "Make 3D floorplans with your phone," available at http://en.floorplanner.com/magicplan, downloaded May 17, 2014, 4 pages.
Subspace—Measure Rooms, available at http://download.cnet.com/Subspace-Measure-rooms/3000-2094_4-75918001.html, downloaded May 17, 2014, 5 pages.
Max Christian, "Just Tap Your Phone on Each Wall and This App Will Draw a Floor Plan," available at http://locometric.com/press/release-march-2014.pdf, Mar. 22, 2014, downloaded May 21, 2014, 1 page.
Pierre Pontevia, "magicplan-AI, a journey into the wonderful world of Deep Learning (Part 1/3)," Aug. 21, 2018, available at https://medium.com/@the_ponpon_/developing-magicplan-ai-part-1-3-83bcdd91228e, downloaded Jul. 8, 2021, 8 pages.

(Continued)

*Primary Examiner* — Hovhannes Baghdasaryan
(74) *Attorney, Agent, or Firm* — DiBerardino McGovern IP Group LLC (57) ABSTRACT

A pre-determined representation of a known boundary is accessed, the pre-determined representation including an indication of a location of the known boundary; a separate measurement that coincides with or crosses the known boundary is accessed, the separate measurement including location data; the indication of the location of the known boundary and the location data are compared; and whether or not the separate measurement is an indication of an interruption in the known boundary is determined based on the comparison.

20 Claims, 6 Drawing Sheets

(56) References Cited

OTHER PUBLICATIONS

Pierre Pontevia, "magicplan-AI, a journey into the wonderful world of Deep Learning (Part 2/3)," Aug. 29, 2018, available at https://medium.com/@the_ponpon_/developing-magicplan-ai-part-2-3-fdf3a62b71ff, downloaded Jul. 8, 2021, 13 pages.

Pierre Pontevia, "magicplan-AI, a journey into the wonderful world of Deep Learning (Part 3/3)," Sep. 7, 2018, available at https://medium.com/@the_ponpon_/developing-magicplan-ai-part-3-3-a0ea3270a96e, downloaded Jul. 8, 2021, 8 pages.

\* cited by examiner

DETERMINATION OF WHETHER A BOUNDARY INCLUDES AN INTERRUPTION

TECHNICAL FIELD

This disclosure relates to determining whether a boundary includes an interruption. The boundary may be, for example, a physical or notional boundary in a structure or landscape.

BACKGROUND

In the construction and/or remodeling of a building or other structure it is common to have a floor plan or a diagram that represents a layout and dimension of the building or other structure.

SUMMARY

In one aspect, a computer-implemented method includes: accessing a pre-determined representation of a known boundary, the pre-determined representation including an indication of a location of the known boundary; accessing a separate measurement that coincides with or crosses the known boundary, the separate measurement including location data; comparing the indication of the location of the known boundary and the location data; and determining whether the separate measurement is an indication of an interruption in the known boundary based on the comparison. If the separate measurement is an indication of an interruption, the method also includes: determining one or more of a position, size, and shape of the interruption; and updating the pre-determined representation of the boundary to include the interruption.

Implementations may include one or more of the following features.

The known boundary may be a physical boundary, and the pre-determined representation may be a pre-determined representation of the physical boundary. The physical boundary may include a wall, and the interruption may be an aperture in the wall. The aperture may be any of a window frame, a window, a doorframe, a doorway, and an opening that passes through the wall. The interruption may be a recessed region that does not pass through the physical boundary.

The known boundary may be a notional boundary, and, in these implementations, the pre-determined representation is a representation of the notional boundary.

The location data may be a measured distance from a reference point. The location data may be a plurality of measured distances from the reference point.

Comparing the indication of the location of the known boundary and the location data may include: determining a difference between each measured distance and the indication of the location of the known boundary to generate difference data; and the method also may include: comparing each determined difference to a threshold; and determining a count of determined differences that exceed the threshold. Determining whether the separate measurement is an indication of an interruption in the known boundary may include comparing the count to a second threshold. At least some of the measured distances may be obtained from different spatial regions, and the difference data may include a two-dimensional image including a plurality of pixels, each being associated with a value that represents the count of determined differences that exceed the threshold for a particular spatial region. In some implementations, a filter is applied to the two-dimensional image to generate filtered difference data. The filter may be an edge detector. Determining whether the separate measurement is an indication of an interruption in the known boundary may include identifying edges in the filtered difference data. The filter may include a threshold operation that applies a second threshold to the difference data.

In some implementations, accessing a separate measurement includes accessing a measurement based on light imaging, detection, and ranging (LiDAR) data.

In some implementations, the method also includes, if the separate measurement is an indication of an interruption, determining a size of the interruption, a shape of the interruption, and a position of the interruption.

In another aspect, an apparatus includes: a light imaging, detection, and ranging (LiDAR) sensor; and a controller configured to: access a pre-determined indication of a spatial location of a boundary; receive LiDAR data related to the boundary from the LiDAR sensor, the LiDAR data including location data for each of one or more spatial regions; determine a location difference between each of the one or more spatial regions and the boundary by comparing the LiDAR data to the indication of the spatial location of the boundary; generate difference data based on the determined location difference; and analyze the difference data to determine whether there is an interruption in the boundary.

In another aspect, a method includes: accessing a pre-determined representation of a known boundary, the pre-determined representation including data that represents a plurality of spatial points on the known boundary; accessing a separate measurement that includes a plurality of measured distances, each measured distance being a distance between a reference point and one of a plurality of spatial regions; determining a location of each spatial region; determining a location difference between each spatial region and the known boundary by comparing at least one of the plurality of spatial points to the determined location of each region; and determining whether the boundary includes one or more interruptions based on the determined location difference.

In some implementations, if the boundary includes at least one interruption, the pre-determined representation of the known boundary is updated to include the interruption.

The details of one or more implementations are set forth in the accompanying drawings and the description below. Other features will be apparent from the description and drawings, and from the claims.

DESCRIPTION

Techniques for detecting interruptions in a boundary are disclosed. The boundary is a location in space that separates two or more regions from each other or otherwise defines the two or more regions as being distinct from each other. The boundary may be a physical barrier or a notional boundary. The techniques disclosed herein improve the accuracy of diagrams such as, for example, floorplans, and result in an improvement in the efficiency of construction of structures such as buildings and landscapes. Moreover, the techniques disclosed herein are more computationally efficient and accurate than other approaches for detecting an interruption in a boundary.

Figures 1, 2:
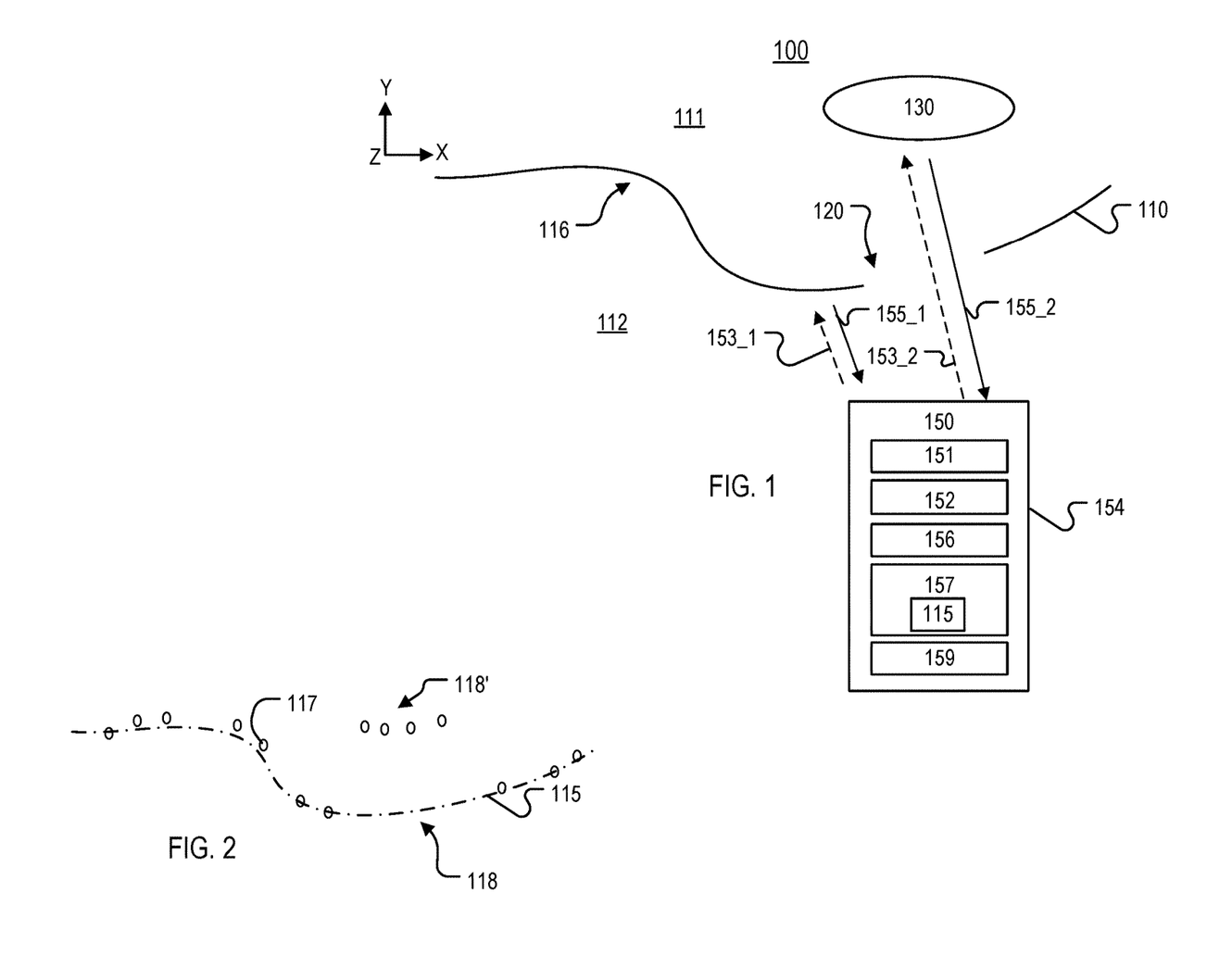
FIG. 1 is a block diagram of an example of a physical space and a sensing system.
FIG. 2 shows a digital representation of an example of a boundary.

FIG. 1 is a block diagram of a physical space 100 and a sensing system 150. The physical space 100 is a three-dimensional space but is shown in an X-Y plane. In the example of FIG. 1, the Z axis extends into and out of the page. In the present disclosure, the X and Y axes are in the horizontal plane and Z is vertical (orthogonal to the X-Y plane). The physical space 100 includes a boundary 110 that separates a first region 111 from a second region 112. The boundary 110 is any type of boundary that separates, defines, or divides two or more regions (the regions 111 and 112 in this example). The boundary 110 may be physical or notional. Examples of physical boundaries include, without limitation, an interior or exterior wall of a building, a fence, and/or a hedge of plants or other type of living wall. An example of a notional boundary is a boundary between a kitchen and a living area in a house with an open floor plan. A notional boundary has a location and separates two or more regions, and may be visually marked (for example, by columns or an interface between two different types of flooring), but is generally not a physical barrier. In the example of FIG. 1, the boundary 110 is a curved path in the X-Y plane. However, the boundary 110 may have other shapes. Additionally, the boundary 110 may extend in the Z direction.

The boundary 110 includes an interruption 120. The interruption 120 is any type of discontinuity in the boundary 110. For example, in implementations in which the boundary 110 is a physical barrier, the interruption 120 may be an opening that passes through the physical barrier or a recess in the physical barrier. To provide a specific example, the boundary 110 may be a wall of a building or house, and the interruption 120 may be a window frame, a window, a door frame, a doorway, or an alcove. In implementations in which the interruption 120 is a notional boundary that does not include any physical barrier, the interruption 120 may extend for all or the entire boundary 110. In other words, the interruption 120 is not necessarily an opening or recess in a physical barrier, and the entire boundary 110 may be an open region across which items and people move without restriction. In the example of FIG. 1, the boundary 110 is a physical barrier and the interruption 120 is an opening that passes through the boundary 110.

The sensing system 150 is configured to examine the physical space 100 to determine whether the boundary 110 includes one or more interruptions (such as the interruption 120). The sensing system 150 senses or probes a physical region 116 that coincides with or overlaps the location of the boundary 110. The data produced by the sensing system 150 is analyzed to determine whether the boundary 110 includes the interruption 120.

The sensing system 150 is capable of measuring distance between the sensing system 150 and a separate object by remote sensing of the separate object and without making direct physical contact with the separate object. For example, the sensor system 150 may be a light (or laser) imaging, detection, and ranging (LiDAR) sensor system; an infrared (IR) sensor system, an optical sensor system, or an ultrasonic sensor system.

The sensing system 150 includes a transmitter 151 and a sensor 152. The transmitter 151 emits examination signals 153_1 and 153_2 (dashed lines) that are directed toward the physical region 116. The characteristics of the examination signals 153_1 and 153_2 depend on the characteristics of the transmitter 151. For example, the transmitter 151 may be an IR transmitter, a radio-frequency (RF) transmitter, an optical source, a laser, or an ultrasonic source. These various transmitters produce, respectively, IR radiation, RF radiation, light beams, laser beams, and sound waves.

The transmitter 151 may include a single element that emits the examination signals 153_1 and 153_2 or a plurality of such elements. For example, the transmitter 151 may be an array of discrete elements, each of which is capable of emitting examination signals. In some implementations, the transmitter 151 is configured to move in the X and/or Y directions relative to the sensing system 150 such that the transmitter 151 is configured to scan the space 116 in the X and/or Y dimensions without moving the entire sensor system 150.

The sensor 152 is configured to detect the type of signal that is emitted by the transmitter 151. For example, in implementations in which the transmitter 151 is a laser or an optical source, the sensor 152 is an optical sensor that is configured to detect light in the wavelength band produced by the transmitter 151. In implementations in which the sensor system 150 is an ultrasonic sensor system, the transmitter 151 and the sensor 152 are an ultrasonic transducer.

The examination signal 153_1 is reflected by the boundary 110 as a return signal 155_1 (solid line). The examination signal 153_2 passes through the interruption 120 and is reflected by an item 130 as a return signal 155_2 (solid line). The return signals 155_1 and 155_2 are detected by the sensor 152. The amount of time between the emission of the examination signal 153_1, 153_2 and the detection of the respective return signal 155_1, 155_2 provides an indication of the distance between the sensor system 150 and the object that caused the return signal. Alternatively or additionally, the intensity of the return signal 155_1, 155_2 relative to the intensity of the respective examination signal 153_1, 153_2 may be used as an indication of the distance between the sensor system 150 and the object that caused the return signal.

The sensor system 150 also includes associated electrical and/or mechanical devices. In the example of FIG. 1, the sensor system 150 includes a housing 154, an electronic processing module 156, an electronic storage 157, and an input/output (I/O) interface 159. The housing 154 provides protection and structure to the sensing system 150. For example, the housing 154 may enclose the electronic processing module 156 and the electronic storage 157, and the transmitter 151, the sensor 152, and the I/O interface 159 may be mounted to the housing 154. Other implementations and arrangements are possible. For example, in some implementations, the sensor 152 and transmitter 151 are mounted to the housing 154, and the electronic storage 157 and electronic processing module 156 are physically separated but in electronic communication with the electronic storage 157 and the processing module 156.

The housing 154 is durable and rugged and may be made of any material and have any shape. The housing 154 may be sized to fit in a human hand, and/or the housing 154 may be configured to be mounted to a tripod or other structure. In some implementations, the sensor system 150 is a smart phone that includes the housing 154, the transmitter 151, the sensor 152, the electronic processing module 156, the electronic storage 157, and the I/O interface 159.

The I/O interface 159 enables data exchange with the sensor system 150, and/or allows data to be presented or displayed at the sensor system 150. The I/O interface 159 enables data and commands to be input into the sensor system 150 and retrieved or sent from the sensor system 150. The I/O interface 159 may include, for example, a visual display or a speaker that produces an audible signal. The I/O interface 159 may be any type of input/output interface that allows a human operator or an automated process to communicate with the sensor system 150 or its components. Moreover, the I/O interface 159 may include additional components that allow the sensor system 150 to send and/or receive data. For example, the I/O interface 159 may include a cellular interface or other wireless communications interface that allows the sensor system 150 to communicate with other devices via a cellular telephone network or the Internet. The I/O interface 159 may include an interface or port that accepts a cable or wire through which data can pass, allowing the system 150 to communicate through a wired connection.

The electronic storage 157 may be volatile memory, such as random-access memory (RAM), or non-volatile memory. In some implementations, and the electronic storage 157 may include both non-volatile and volatile portions or components. The electronic processing module 156 may be any type of electronic processor and can be more than one electronic processor. The electronic processing module 156 may be one or more processors suitable for the execution of a computer program such as a general or special purpose microprocessor, and any one or more processors of any kind of digital computer.

The electronic storage 157 stores instructions that, when executed, cause the electronic processing module 156 to communicate with other components in the system 150. The instructions may be in the form of, for example, a computer program, software, and/or a function. The instructions may be instructions to cause the electronic storage 157 to store data produced by the sensor 152. The instructions may cause the electronic processing module 156 to execute one or more mathematical relationships to identify the interruption 120 and/or to determine a size and/or shape of the interruption 120. The instructions may include instructions that cause the electronic processing module 156 to execute the process 600 shown in FIG. 6. Additionally, the electronic storage 157 stores data, including a digital representation 115 of the boundary 110. FIG. 2 shows the digital representation 115 (dash-dot line) in the X-Y plane. The digital representation 115 may be stored as a collection of global positioning system (GPS) coordinates that define the spatial characteristics of the boundary 110 and/or the digital representation 115 may be a mathematical relationship that defines the spatial characteristics of the boundary 110. The digital representation 115 is pre-determined. In some implementations, the representation 115 is determined using the techniques disclosed in U.S. Pat. No. 8,868,375, which is incorporated herein by reference in its entirety. For example, the diagram 460 discussed in U.S. Pat. No. 8,868,375 may be used as the representation 115. However, other implementations are possible, and the representation 115 may be determined in any manner or may be provided by an operator of the sensor system 150 via the I/O interface 159.

As discussed in greater detail below, and referring also to FIG. 2, in operational use of the sensor system 150, the return signals 155_1, 155_2 are analyzed to determine an estimated or computed boundary 117 (shown with "o" in FIG. 2). The estimated or computed boundary 117 is compared to the representation 115 to determine whether the boundary 110 includes one or more interruptions. In the example of FIG. 1, the boundary 110 is a physical barrier that includes the opening 120. The examination signal 153_1 is reflected by the physical barrier. The examination signal 153_2 passes through the opening 120 and is reflected by the item 130, which is displaced in the Y direction relative to the boundary 110. The representation 115 does not include a representation of the interruption 120. Thus, a spatial location of a portion 118 of the representation 115 differs from a corresponding portion 118' of the estimated or computed boundary 117. The discrepancy between the spatial location of the portion 118 and the portion 118' indicates that boundary 110 includes the interruption 120.

Figure 3:
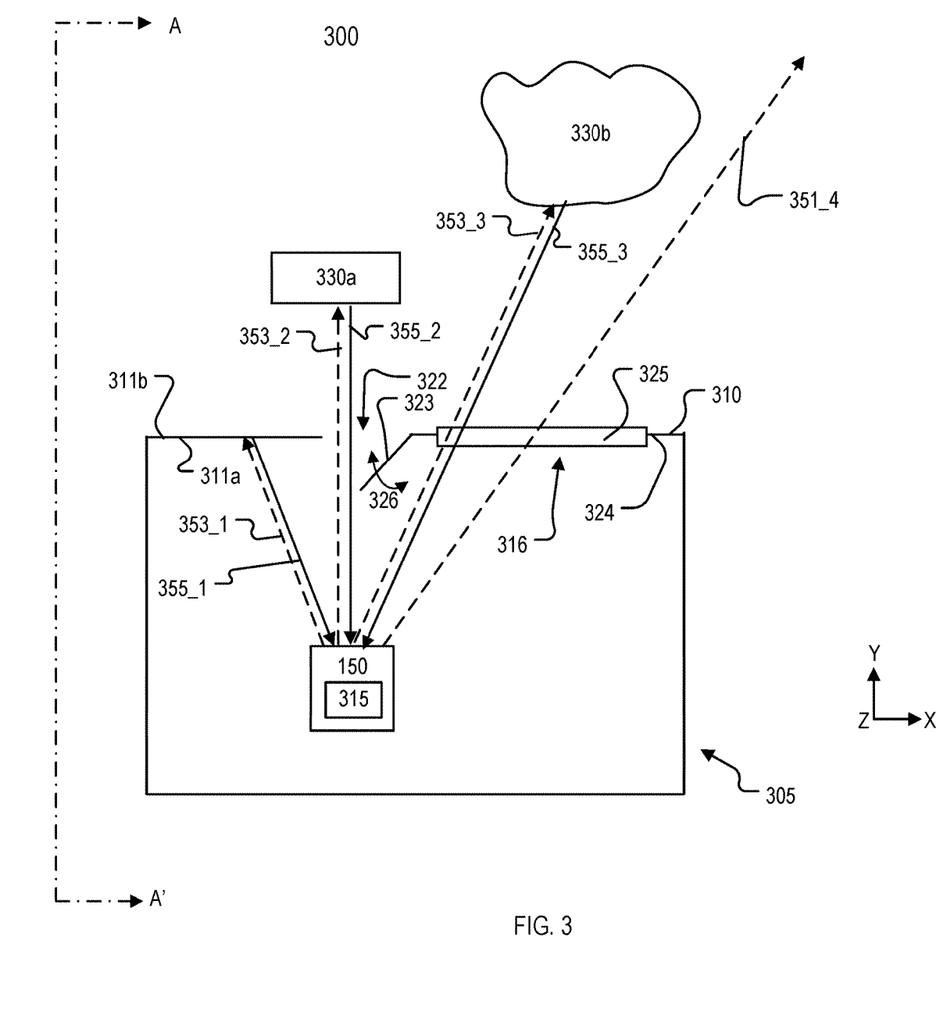
FIG. 3 is a top view of an example of a scene in the X-Y plane.
Figure 4:
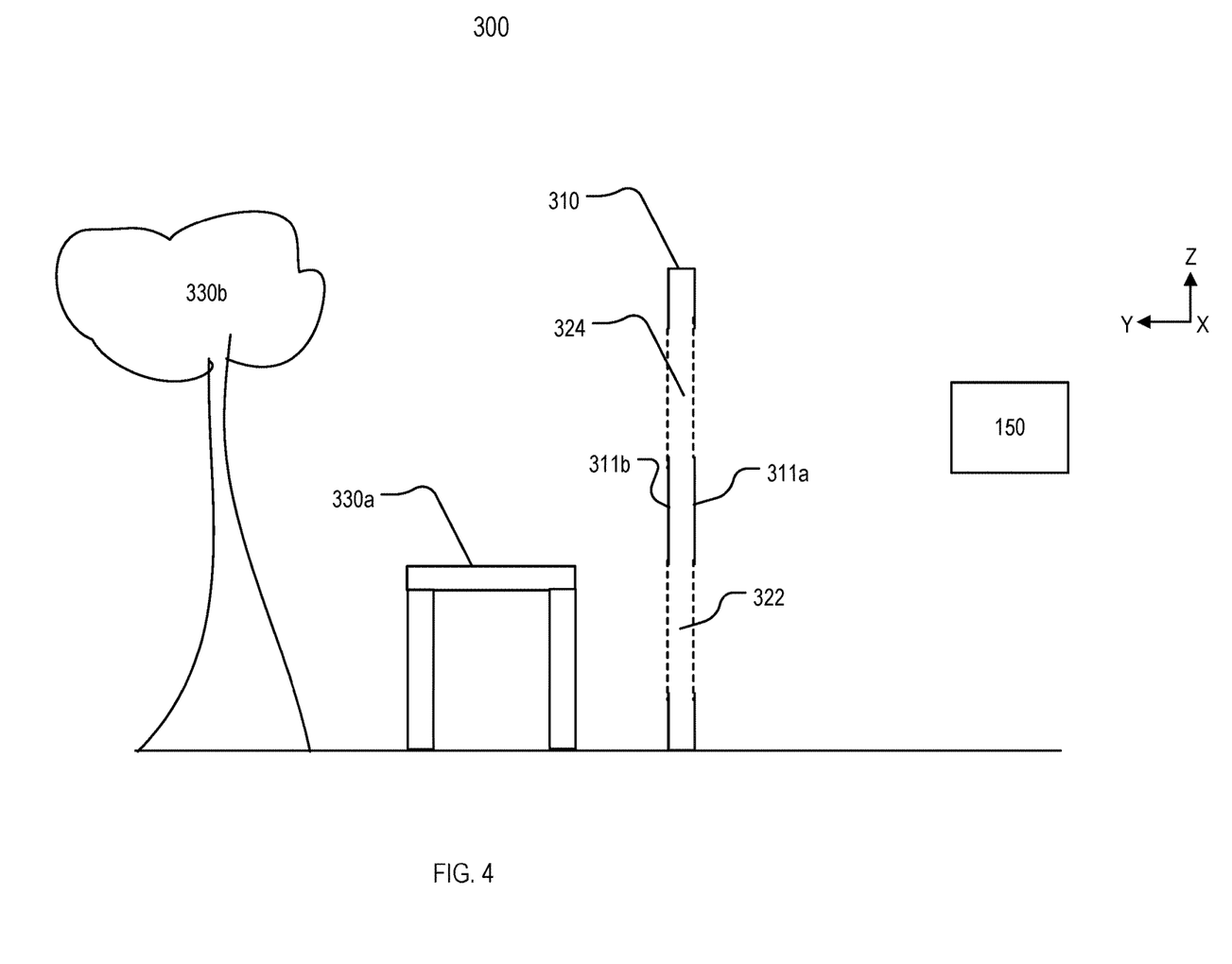
FIG. 4 is a side view of part of the scene of FIG. 3 taken along the line A-A' of FIG. 3.
Figure 5:
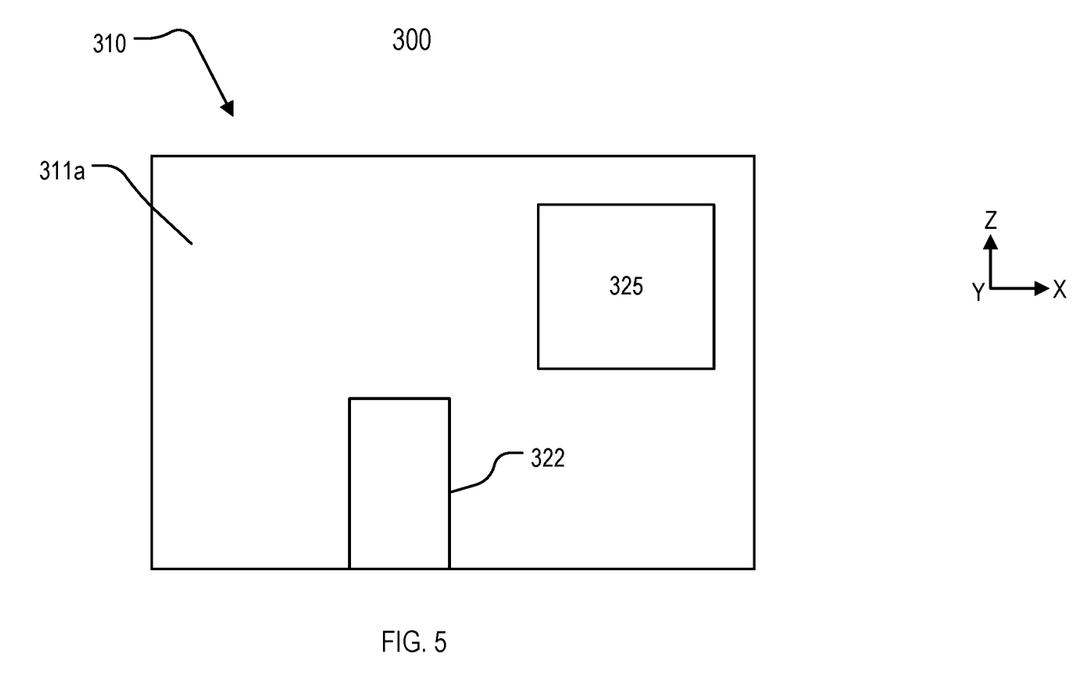
FIG. 5 is an elevation of a side of a wall.
Figure 6:
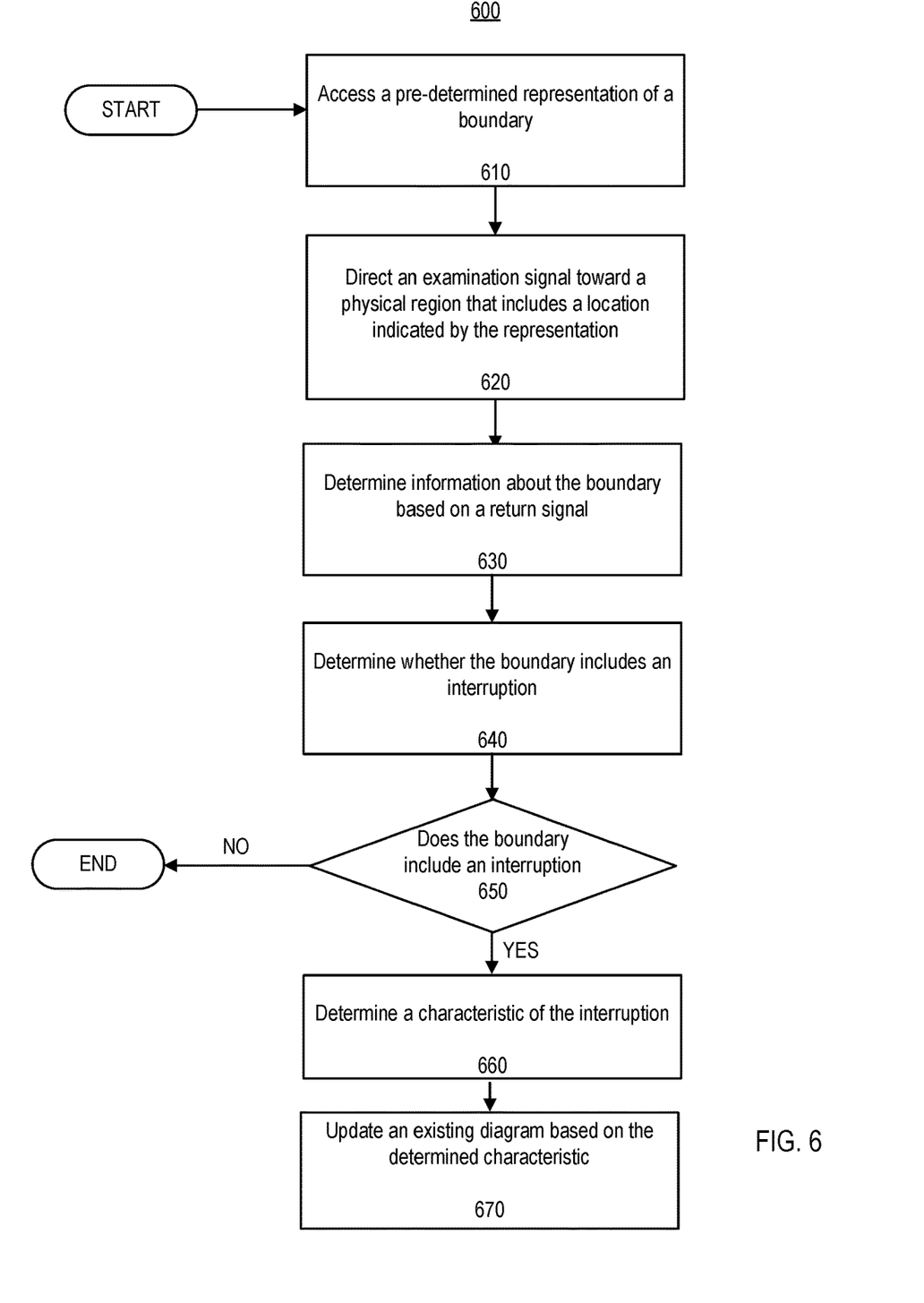
FIG. 6 is a flow chart of an example of a process for determining whether a boundary includes an interruption.

FIGS. 3-5 relate to a scene 300 that is discussed with respect to the process 600 of FIG. 6. FIG. 3 is a top view of the scene 300 in the X-Y plane. FIG. 4 is a side view of part of the scene 300 taken along the line A-A' of FIG. 3. In FIG. 4, hidden elements (specifically a doorway 322 and a window frame 324) are shown with short dashed lines. FIG. 5 is an elevation of a side 311a of the wall 310 in the X-Z plane.

The scene 300 includes a house 305 that has a plurality of walls, including a wall 310. The wall 310 is substantially rectangular and extends in the X-Z plane. The wall 310 includes a doorway 322, which accommodates a door 323, and a window frame 324, which accommodates a window 325. The door 323 is attached to the doorway 322 by hinges or a similar fasting mechanism that allows the door 323 to move along an arc 326 to open and close. The door 323 is shown in the open position in FIG. 3. When the door 323 is in the closed position, the door 323 extends substantially in the Y-Z plane. The door 323 is made of a solid material such as, for example, metal or wood, and may or may not include transparent portions made of glass or a similar material.

The window 325 is held in the window frame 324 such that the window 325 extends in the Y-Z plane. The window 325 is made of a material that is transparent to visible light and other wavelengths of radiation. For example, the window may be made of glass.

The sensing system 150 is inside the house 305. The scene 300 also includes objects 330a, 330b that are outside of the house 305. In the example shown, the objects that are outside of the house 305 are a table 330a and a tree 330b. The wall 310 includes sides 311a and 311b. The side 311a faces the sensing system 150 and the side 311b faces the objects 330a and 330b.

FIG. 6 is a flow chart of the process 600. The process 600 may be used to determine whether a boundary includes one or more interruptions. In the example discussed below, the process 600 is performed by the electronic processing module 156 of the sensing system 150. Moreover, in the example discussed below, the sensor system 150 is a LiDAR system with an optical transmitter 151 (for example, a laser) that produces pulsed light beams. However, the process 600 may be applied to determine whether interruptions exist in other boundaries, such as the boundary 110 of FIG. 1, and other configurations of the sensing system 150 may be used to perform the process 600. For example, the process 600 may be performed with an implementation of the sensing system 150 that includes an RF transmitter and an RF receiver.

Furthermore, the process 600 may be performed by a sensing system other than the sensing system 150.

A pre-determined representation 315 (FIG. 3) of the wall 310 is accessed (610). The pre-determined representation 315 may be accessed from the electronic storage 157 or entered through the I/O interface 159. The pre-determined representation 315 includes location information about the wall 310. For example, the pre-determined representation 315 may be a plurality of GPS or other location coordinates that define the location of the wall 310. The pre-determined representation 315 may be a line that defines the location of the wall 310. In these implementations, the pre-determined representation 315 includes a plurality of (x,y) coordinates that define the location of the wall in the X-Y plane at a constant Z coordinate. In other implementations, the pre-determined representation 315 defines an outline of the wall 310 in the X-Z plane.

Examination signals 353_1, 353_2, 353_3, 353_4 are directed toward a physical space 316 that coincides with the location indicated by the representation 315 (620). The examination signals 353_1, 353_2, 353_3, 353_4 are shown in FIG. 3 as dashed lines. In the example shown in FIGS. 3-5, the sensing system 150 is oriented such that the transmitter 151 emits the examination signals 353_1, 353_2, 353_3, 353_4 toward the side 311a of the wall 310. The examination signals 353_1, 353_2, 353_3, 353_4 radiate to locations throughout the physical space 316. In some implementations, the transmitter 151 is configured to emit a relatively narrow examination signal 153 and the sensor system 150 (and the transmitter 151 and sensor 152) are moved or scanned to ensure that the entire physical space 316 is analyzed for interruptions.

Additionally, information about the examination signals 353_1, 353_2, 353_3, 353_4 may be stored on the electronic storage 157 and/or output through the I/O interface 159. For example, a time stamp that records the time at which each examination signal 353_1, 353_2, 353_3, 353_4 was emitted may be stored on the electronic storage 157 and/or output through the I/O interface 159. Additional or other information, such as the location of the sensor system 150 when each examination signal 353_1, 353_2, 353_3, 353_4 was emitted and/or the direction in which each examination signal 353_1, 353_2, 353_3, 353_4 was emitted, may be stored on the electronic storage 157 and/or output through the I/O interface 159. The direction in which each examination signal 353_1, 353_2, 353_3, 353_4 was emitted may be expressed as an angle relative to the X, Y, and/or Z directions.

For the purpose of providing an example, in FIG. 3, each examination signal 353_1, 353_2, 353_3, 353_4 is a pulsed light beam and is also referred to as the examination beam 353_1, 353_2, 353_3, 353_4. Glass is transparent to the wavelength or wavelengths of light produced by the transmitter 151. In the example shown in FIG. 3, the examination signal 353_1 interacts with the side 311a of the wall 310. The examination signals 353_2 and 353_3 pass through the doorway 322 and window 325 respectively. The examination signal 353_4 also passes through the window 325.

Information related to the wall 310 is determined based on return signals 355_1, 355_2, 355_3 (630). The return signal 355_1 is the reflection of the examination signal 353_1 from the side 311a of the wall 310. The return signal 355_2 is the reflection of the examination signal 353_2 from the table 330a. The return signal 355_3 is the reflection of the examination signal 353_3 from the tree 330b. The examination signal 353_4 passes through the window 325 but does not interact with any object that is within range of the system 150. Thus, the examination signal 353_4 does not have a corresponding return signal.

The information related to the wall 310 may include location information, such as a distance between the sensor 152 and objects that generate the return signals 355_1, 355_2, 355_3 (also referred to as return beams 355_1, 355_2, 355_3). The return signals 355_1, 355_2, 355_3 are detected or sensed by the sensor 152, and data related to the return signals 355_1, 355_2, 355_3 is stored in the electronic storage 157 and/or output through the I/O interface 159. The data related to the return signals 355_1, 355_2, 355_3 may include the time of arrival of the return signals 355_1, 355_2, 355_3 and/or the intensity of the return signals 355_1, 355_2, 355_3. An indication that the examination signal 353_4 did not generate a corresponding return signal may be stored in the electronic storage 157.

The information related to the wall 310 includes the distance D between the sensor 152 and the object that caused each return signal 355_1, 355_2, 355_3. The distance D is determined from the time difference between the emission of each examination signal 353_1, 353_2, 353_3 and the respective return beam 355_1, 355_2, 355_3. The information related to the wall 310 may include additional information. For example, the information related to the wall 310 may include (x,y,z) coordinates of the object that caused each return beam 355_1, 355_2, 355_3. The (x,y,z) coordinates may be relative to the (x,y,z) coordinates of the sensor system 150, relative to another known location, or absolute location coordinates. To provide a specific example, the location of the portion of the tree 330b that caused the return beam 355_3 may be determined based on the direction in which the examination signal 353_3 was emitted. For example, if the examination beam 353_3 was emitted in the Y-Z plane at 15 degrees relative to the Y direction, and the determined distance is D, the portion of the tree 330b that caused the return beam 355_3 is displaced in the Z direction relative to the sensor 152 by about Dsin(15°). The location in the x and y dimensions may be determined in a similar manner.

Whether or not the wall 310 includes an interruption is determined (640). To determine whether the wall 310 includes an interruption, a measured or determined distance D is compared to an expected distance E for each probed region of the space 316. A probed region of the space 316 is any region that receives one or more examination signals. In the example of FIG. 3, the probed regions are the regions of the side 311a that interact with an examination signal and regions of the wall 310 through which an examination signal crosses or passes through. The expected distance is the distance between the sensor system 150 and the wall 310 based on the representation 315 with no interruptions. In other words, the expected distance E is the distance that would be computed in (630) if the examination beam is reflected from a portion of the wall 310 that does not include an interruption that transmits the examination beam. The expected distance E exceeds the determined distance D when the examination beam passes through the wall 310. The expected distance E may be different for each probed region depending on the orientation of the transmitter 151 and the sensor 152 relative to each probed region. However, in the discussion below, the expected distance is referred to as the expected distance E for simplicity.

In the example shown in FIG. 3, the examination beam 353_3 passes through the window 325 and reflects off of the tree 330b as the return beam 355_3. The tree 330b is outside of the house 305 and is beyond the wall 310. Thus, a determined distance D3 that is calculated based on the return beam 355_3 exceeds the expected distance E. Similarly, the examination beam 353_2 passes through the doorway 322 and reflects off the table 330a as the return beam 355_2. A determined distance D2, which is based on the examination beam 353_2 and the return beam 355_2, also exceeds the expected distance E. The examination beam 353_4 leaves the house 305 through the window 325 and does not reflect off an object that is in range of the sensing system 150, and a detectable return beam is not generated. In this instance, a determined distance is not computed and is assumed to exceed the expected distance E. The determined distance in this situation may be set to a pre-set constant value that exceeds the expected distance E.

On the other hand, the examination beam 353_1 reflects off of the side 311a as the return beam 355_1. The expected distance D1 that is determined based on the examination beam 353_1 and the return beam 355_1 is equal to the expected distance E or differs from the expected distance E by a only a negligible amount or only a small amount due to measurement inaccuracies. The negligible or small amount may be stored on the electronic storage 157 as a threshold value.

By comparing the determined distance D to the expected distance E for each probed region in the space 316, each probed region is characterized as being a region that reflects an examination beam or a region that transmits the examination beam. In some implementations, the determined distance D and the expected distance E are compared for each probed region by subtracting the expected distance E from the determined distance D (or vice versa) for each probed region. The absolute value of the difference is compared to the threshold value. If the absolute value of the difference is greater than the threshold value, than that probed region is a region that transmits the examination beam. Otherwise, the probed region is not a region that reflects the examination beam and the probed region is considered to be associated with a physical barrier that does not transmit the radiation of the examination beam.

The threshold value may be zero or a number greater than zero. In implementations in which the threshold value is zero, a probed region is considered to be a non-transmitting region only when the determined distance D is the same as the expected difference E. In implementations in which the threshold value is greater than zero, the difference between the expected distance E and the determined distance D may be greater than zero. As noted above, using a threshold value greater than zero provides a margin for measurement errors.

In some implementations, each probed region receives a plurality of examination beams either simultaneously or over time. For example, the sensor system 150 may be a LiDAR system, and the transmitter 151 may be a laser that emits many pulses of light, and each pulse is a separate examination beam that is provided to a particular region. In these implementations, a camera or two-dimensional array of photodiodes, photo detectors, or other optical sensors or detectors may be used as the sensor 152. The sensor 152 produces 2-dimensional data at a frame rate of, for example, 60 frames per second. In these implementations, the laser may be configured to emit 500 or more pulses of light during the 16.67 millisecond duration of a single frame, and each value of the 2-dimensional data produced by the sensor 152 is based on the return signals generated by the 500 or more pulses of light (each of which is an examination signal). The two-dimensional data produced by the sensor 152 is an array of numerical values, each of which represents the amount of light returned from a particular physical area in the space 316.

The 2-dimensional data from the sensor 152 is processed into two-dimensional image data. Each pixel of the 2-dimensional image data corresponds to a probed region in the space 316. Specifically, each pixel in the two-dimensional image data is associated with a value that represents the amount of light returned from a physical area that has a height (Z direction) and width (X direction) that is determined by the needs of the application. The size of the probed region may be chosen to be as large as possible while being small enough to measure the smallest interruptions expected by the user and/or small enough to measure the edges of interruptions to within the accuracy desired for the application. For example, each probed region may correspond to a contiguous square region of the space 316 that is 0.01 m high (Z direction) and 0.01 m wide (X direction). In an implementation in which the space 316 is 3 m×3 m, and each probed region corresponds to a 0.01 m high×0.01 m wide region in the space 316, the raw data from the sensor 152 is processed into two-dimensional image data that includes 300×300 pixels.

The sensor 152 may include many sensors or detectors, and the sensor 152 may have a higher resolution than the two-dimensional image that is derived from the raw data produced by the sensor 152. Thus, the pixel value for each probed region may be based on data returned from more than one detector in the sensor 152. For example, the pixel value for each probed region may be based on the data from a set of 10 or 100 adjacent pixels that receive radiation from the probed region.

The determined distance D for each examination beam is computed and compared to the expected distance E for that examination beam. The difference between the determined distance D and the expected distance E is referred to as the difference or difference value. The difference for each probed region may be stored as 2-dimensional image data in which each pixel has the difference as its value. In some implementations, pixels that have a difference that is less than the threshold value are assigned a specific value, for example, zero. Pixels that have a difference that is greater than the threshold value are assigned another specific value, for example, one. This results in a two-dimensional binary image in which pixels that have a value of 1 correspond to probed regions in which the examination beam did not interact with a physical barrier at the location indicated by the representation 315 and pixels that have a value of 0 correspond to probed regions in which the examination beam interacted with a physical barrier substantially at the location indicated by the representation 315.

In some implementations, many frames of data are collected by the sensor 152, and each frame results in another image in which the distance D is determined for the probed region associated with each pixel and compared to the expected distance E. The difference for each pixel in the image is compared to the threshold. If the distance to the probed region associated with that pixel exceeds the threshold, the pixel value is set to 1. If the distance to the probed region associated with that pixel does not exceed the threshold, the pixel value is set to 0.

Figure 7:
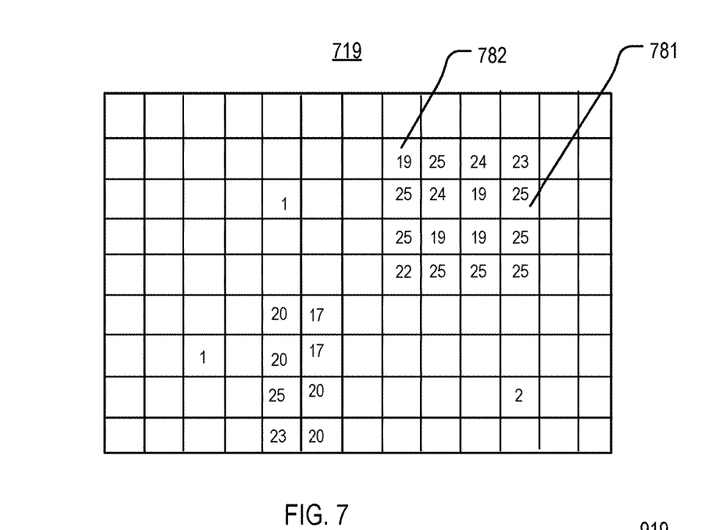
FIG. 7 is an example of image data.

FIG. 7 shows an example of image data 719 that could be generated in this manner. To create the image data 719, the space 316 is imaged over time, and the sensor 152 produces a plurality of 2-dimensional data sets that each represent the space 316 at a different time. Each 2-dimensional data set is used to form a 2-dimensional image, and each pixel in each image is set to the number of examinations beams for which the distance D for the probed region associated with the pixel exceeded the expected distance E. The value of each pixel is added to the value for the corresponding pixel in another image to form the image data 719. In other words, each of the pixel values over time are added to form the image data 719 (FIG. 7). Each pixel value in the image data 719 represents the sum of the value of that same pixel over time. Adding the pixel values from a plurality of frames in this manner may improve the overall accuracy of the process 600.

Continuing the example above in which the pixel value indicates the number of examination beams where the distance exceeds the threshold, in the image 719, the value of each pixel is equal to the total number of times an examination beam was transmitted through the probed region of the space 316 that corresponds to that pixel. For example, an examination beam was transmitted through the probed region that corresponds to the pixel 781 25 times, and the examination beam was transmitted through the probed region that corresponds to the pixel 782 19 times.

Twenty-five frames of data are used in the example shown in FIG. 7. The pixels in the image 719 that do not have a value are zero and never transmitted an examination beam. The pixels in the image 719 with the highest values correspond to the doorway 322 and the window 325 because these portions of the wall 310 transmit almost all incident examination beams. The value of each pixel in the image 719 that is associated with the doorway 322 and the window 325 is not 25 because of measurement errors. For example, debris or imperfections on the window 325 may give rise to stray return beams that result in some pixels in the window erroneously having a zero value in some frames. Additionally, some portions of the side 311a may occasionally fail to generate a return beam due to changing light conditions or sensor errors. The failure to reflect a return beam causes a false result that the examination beam passed through the wall 310. Examples of such errors are shown in the image 719 in the pixels that have values of 1 or 2.

The image 719 is analyzed to determine whether the wall 310 includes interruptions (640). The image 719 is analyzed by applying an interruption threshold to remove the pixels that are likely caused by errors. The interruption threshold may be stored on the electronic storage 157 or entered through the I/O interface 159. The interruption threshold is a numerical value and may be set to exclude, for example, pixels that show a difference between the expected distance E and the determined distance D that exceeds the threshold value in fewer than 5% of the frames. Such excluded pixels are assumed to correspond to a probed region that does not actually transmit examination beams. In the example shown in FIG. 7, 5% of the frame is 5 frames, and the interruption threshold is 5. Thus, after the interruption threshold is applied to the image 719, the three pixels having values of less than 5 are set to have a value of zero. Other values of the interruption threshold may be used. For example, the interruption threshold may be 0% of frames, 1% of frames, 2% of frames, 10% of frames, or 20% of frames. Moreover, the interruption threshold may be stored on the electronic storage as a number instead of or in addition to a percentage.

Any region of the image 719 that has a pixel value greater than the interruption threshold is considered an interruption. Thus, in this example, the wall 310 is determined to include at least one interruption (650), and a characteristic of the interruption is determined (660).

The characteristic of the interruption may include, for example, a size of the interruption, a location of the interruption (for example, a location of the perimeter or edges of the interruption), and/or a shape of the interruption. The area of the interruption may be determined by counting the pixels that are included in the interruption and multiplying the number of pixels by the area of the physical area represented by each pixel. The shape of the interruption may be determined by counting the number of pixels in the X and/or Z directions.

In this example, an image 819 (FIG. 8) is produced by applying the interruption threshold to the image 719. In the image 819, light regions are the portions of the image 719 that had a pixel value greater than the interruption threshold. The image 819 is analyzed to determine one or more characteristics of the interruptions, which are the doorway 322 and the window 325. In the image 819, the light regions correspond to the regions of the image 719 that had a value greater than the interruption threshold (which is 5 in this example).

Figure 8:
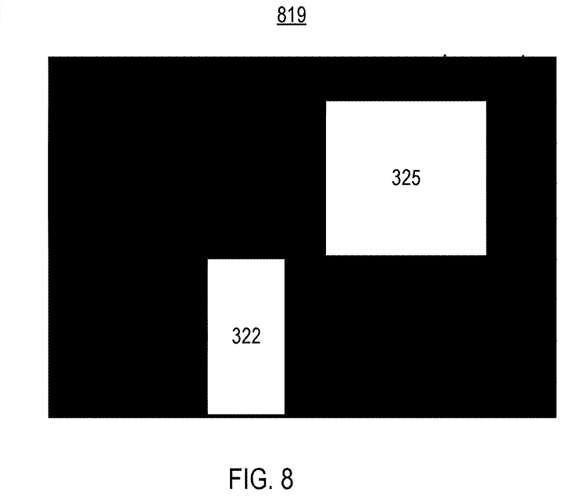
FIG. 8 is a thresholded version of the image data of FIG. 7.
Figure 9:
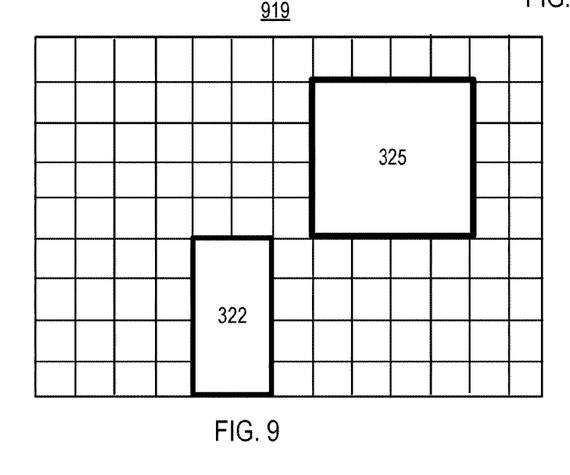
FIG. 9 is an example of a filtered image.

Various operators and/or filters may be applied to the image 819 to generate a filtered image 919 (FIG. 9). The filtered image 919 may be referred to as filtered difference data. The filtered image 919 is analyzed determine characteristics of the interruptions. For example, an edge detector may be applied to the image 819 to determine the perimeter of the doorway 322 and the window 325 to produce the filter image 919 (FIG. 9). After the perimeters are determined, the perimeters are analyzed to determine the size, shape, and/or location of the doorway 322 and the window 325. The size, shape, and/or location of the doorway 322 and window 325 may be determined by accounting for the physical area represented by each pixel (0.01 m×0.01 m in this example) and the count and/or extent of the doorway 322 and the window 325. The location of the doorway 322 and window 325 within the image 319 may be determined from the location data associated with the representation 315 and the relative location of the pixels of the doorway 322 and window 325 in the image 919. Furthermore, once the size, shape, and/or location of the doorway 322 and the window 325 are determined within the image 319, the size, shape, and/or location of the doorway 322 and the window 325 along the wall 310 also may be determined using the location information of the representation 315 and/or the known location and orientation of the sensor 152.

Thus, the doorway 322 and the window 325 are located and detected based on relatively simple spatial filtering and image analysis. This approach is computationally efficient and may be more accurate than existing approaches used to find interruptions in boundaries. For example, the approach discussed above is more computationally efficient than an approach that relies on neural networks and/or matching collected image data against a large database of images of known items such as doors and windows. Furthermore, the approach discussed above with respect to, for example, FIGS. 6-9, also provides accurate dimensions (for example, width and/or height) of the actual apertures and recesses in the wall 310 (or other examined boundary). The disclosed approach is more flexible than commonly used approaches because the disclosed approach can capture a fully open door, even an open "pocket door", which has barely any visual appearance and thus difficult for the commonly used image-based neural network approach to capture. Additionally, the approach discussed above is less prone to false positives, as it detects objects that have the physical characteristics of doors and windows and is not confused by something that merely has a visual appearance of a door and/or window. For example, the approach discussed above detects openings, recesses, and/or regions that transmit radiation produced by the transmitter 151 rather than simply relying on the visual appearance of such objects.

In some implementations, the representation 315 is updated with the determined characteristic of the interruption (670). For example, the representation 315 may be a floor plan or other diagram, and the floor plan may be updated to indicate the size, shape, and/or location of the interruption. The interruption may be included in the floor plan or other representation by, for example, symbols that overlay the original representation or by replacing the portion or portions of the original representation that include the interruption to more accurately reflect the interruption. For example, if the representation 315 indicates that the wall 310 is solid in the X-Z plane, the process 600 may revise the representation 315 to include two rectangles, one that represents the door 322 and one that represents the window 325.

Moreover, in some implementations, the electronic storage 157 stores instructions that causes the system electronic processing module 156 to perform a double check of the interruption found in (640). For example, the instructions may include rules against which the detected interruptions are checked against. An example of such a rule is the vertical location of an interruption that is the shape and size of a door. If the bottom of such an interruption is near a bottom edge of a wall in the representation 315, it is more likely to be a door. Furthermore, in some implementations, the process 600 includes asking for user input (for example, through the I/O interface 159) to confirm whether a detected interruption is an interruption. Additionally, in implementations in which the representation 315 is updated with the determined characteristic of the interruption or interruptions, the user may have the option to choose their own symbol type to show the interruption from a broader range of symbols. For example, a menu and user interface may be visually presented at the I/O interface 159.

If no interruptions are determined in (640) and (650), the process ends or returns to (610). For example, when no interruptions are determined in (640), an operator may set the interruption threshold to a lower value and repeat the process 600 and analyze the results to ensure that any actual interruptions have been detected.

The above discussion is provided as an example, and other implementations and examples are possible. For example, the discussion above relates to the wall 310 which includes two interruptions that pass through the wall 310. However, the process 600 may be used to analyze a notional boundary that does not include any physical barriers. In these implementations, the physical space 316 does not generate any actual return beams (but the system 150 may detect false return beams and other artifacts). In examples in which the boundary is notional, the entire physical space 316 will appear in an image such as the image 719 or the image 819 as an interruption because all of the actual return beams are reflections from physical objects that are beyond the physical space 316 and beyond the location of the notional boundary.

Moreover, although the images 719, 819, and 919 are discussed with respect to the process 600, the process 600 may be performed with data other than the images 719, 819, and 919. For example, the determination of whether the wall 310 or other boundary includes an interruption may be performed by comparing a location of various detected points to a curve or line that represents a location of the boundary, similar to the example discussed with respect to FIGS. 1 and 2. In another example, spatial operators such as edge detectors may be applied directly to the image 719 without applying the interruption threshold and without generating the image 819.

The above described implementations and other implementations are within the scope of the claims.

What is claimed is:

1. A computer-implemented method comprising:
accessing a pre-determined representation of a known boundary, the pre-determined representation comprising an indication of a location of the known boundary;
accessing a separate measurement that coincides with or crosses the known boundary, the separate measurement comprising location data, wherein the location data comprises a plurality of measured distances from a reference point;
comparing the indication of the location of the known boundary and the location data, wherein comparing the indication of the location of the known boundary and the location data comprises: determining a difference between each measured distance and the indication of the location of the known boundary to generate difference data;
comparing each determined difference to a threshold;
determining a count of determined differences that exceed the threshold;
determining whether the separate measurement is an indication of an interruption in the known boundary by comparing the count to a second threshold; and
if the separate measurement is an indication of an interruption:
determining one or more of a position, size, and shape of the interruption; and
updating the pre-determined representation to include the interruption.

2. The computer-implemented method of claim 1, wherein the known boundary is a physical boundary, and the pre-determined representation is a pre-determined representation of the physical boundary.

3. The computer-implemented method of claim 2, wherein the physical boundary comprises a wall, and the interruption comprises an aperture in the wall.

4. The computer-implemented method of claim 3, wherein the aperture comprises any of a window frame, a window, a doorframe, a doorway, and an opening that passes through the wall.

5. The computer-implemented method of claim 2, wherein the interruption comprises a recessed region that does not pass through the physical boundary.

6. The computer-implemented method of claim 1, wherein the known boundary is a notional boundary, and the pre-determined representation comprises a representation of the notional boundary.

7. The computer-implemented method of claim 1, wherein at least some of the measured distances are obtained from different spatial regions, and the difference data comprises a two-dimensional image comprising a plurality of pixels, each pixel comprising a value that represents the difference between one or more measured distances and the indication of the known boundary for a particular spatial region;
comparing each determined difference to a threshold comprises comparing the value of the pixels in the difference data to the threshold; and
determining a count of determined differences that exceed the threshold comprises: determining a count of determined differences that exceed the threshold for the different spatial regions, and generating a second two-dimensional image comprising a plurality of pixels, each pixel of the second two-dimensional image comprising a value that represents the count of determined differences that exceed the threshold for a particular spatial region.

8. The computer-implemented method of claim 7, further comprising applying a filter to the second two-dimensional image to generate filtered difference data.

9. The computer-implemented method of claim 8, wherein the filter comprises an edge detector.

10. The computer-implemented method of claim 9, wherein determining whether the separate measurement is an indication of an interruption in the known boundary comprises identifying edges in the filtered difference data.

11. The computer-implemented method of claim 8, wherein the filter comprises a threshold operation that applies a second threshold to the second two-dimensional image.

12. The computer-implemented method of claim 1, wherein accessing a separate measurement comprises accessing a measurement based on light imaging, detection, and ranging (LiDAR) data.

13. The computer-implemented method of claim 1, further comprising: if the separate measurement is an indication of an interruption, determining a position, a size of the interruption, and a shape of the interruption.

14. An apparatus comprising:
a light imaging, detection, and ranging (LiDAR) sensor; and
a controller configured to:
  access a pre-determined indication of a spatial location of a boundary;
  receive LiDAR data related to the boundary from the LiDAR sensor, the LiDAR data comprising location data for each of one or more spatial regions, wherein the location data for each spatial region comprises a plurality of indications of a distance between the LiDAR sensor and the spatial region;
  determine a plurality of location differences between each of the spatial regions and the boundary by comparing the LiDAR data to the indication of the spatial location of the boundary;
  generate difference data based on the plurality of determined location differences; and
  analyze the difference data to determine whether there is an interruption in the boundary, wherein to analyze the difference data, the controller is configured to:
    compare each location difference to a threshold; and
    determine a count of location differences that exceed the threshold for each spatial region.

15. A method comprising:
accessing a pre-determined representation of a known boundary, the pre-determined representation comprising data that represents a plurality of spatial points on the known boundary;
accessing a separate measurement that comprises a plurality of measured distances, each measured distance being a distance between a reference point and one of a plurality of spatial regions;
determining a location of each spatial region based on the plurality of measured distances;
determining a location difference between each spatial region and the known boundary by comparing at least one of the plurality of spatial points to the determined location of each region;
comparing the location difference for each spatial region to a threshold;
determining a count of location differences for each spatial region that exceed the threshold; and
determining whether the boundary includes one or more interruptions based on the count.

16. The method of claim 15, further comprising, if the boundary includes at least one interruption, updating the pre-determined representation of the known boundary to include the interruption.

17. The computer-implemented method of claim 1, wherein at least some of the measured distances are obtained from different spatial regions, and the difference data comprises a two-dimensional image comprising a plurality of pixels.

18. The computer-implemented method of claim 1, wherein the reference point comprises a location of a measurement sensor that produced the separate measurement.

19. The apparatus of claim 14, wherein the controller is further configured to determine a plurality of distance measurements based on the plurality of indications of distance.

20. The apparatus of claim 19, wherein the plurality of indications of a distance comprise a plurality of indications of a time between emission of an optical examination signal and detection of a reflection of the optical examination signal.

* * * * *